United States Patent [19]

Dupuis et al.

[11] Patent Number: 4,499,575
[45] Date of Patent: Feb. 12, 1985

[54] GROUP OF TERMINAL UNITS FOR A DIGITAL EXCHANGE

[75] Inventors: Bernard Dupuis, Montigny Le Bretonneux; Francois Behague, Gif Sur Yvette, both of France

[73] Assignee: Compagnie Industrielle des Telecommunications Cit-Alcatel, Paris, France

[21] Appl. No.: 420,210

[22] Filed: Sep. 20, 1982

[30] Foreign Application Priority Data

Sep. 18, 1981 [FR] France .............................. 81 17645

[51] Int. Cl.$^3$ ............................................... H04J 3/00
[52] U.S. Cl. ....................................... 370/58; 370/100
[58] Field of Search ....................... 370/58, 66, 16, 63, 370/64, 100

[56] References Cited

U.S. PATENT DOCUMENTS

| 4,074,077 | 2/1978 | Charransol et al. ................... 370/63 |
| 4,107,480 | 8/1978 | Schlichte ............................... 370/58 |
| 4,201,891 | 5/1980 | Lawrence et al. ..................... 370/58 |
| 4,320,501 | 3/1982 | Le Dieu et al. ....................... 370/63 |

FOREIGN PATENT DOCUMENTS 0016426 10/1980 European Pat. Off. .

OTHER PUBLICATIONS

International Conference on Communications, Jun. 8–12, 1980, Seattle, USA., Chea et al., Circuit Terminations etc. pp. 46.3.1 to 46.3.7.
International Switching Symposium, Oct. 25–29, 1976, Kyoto, Japan, Wurhmann Corrective Maintenance in the Integrated PCM etc., pp. 423.3.1 to 423.3.8.
Telcom Report (Siemens Revue) 1981 Special Issue "EWSD Digital Switching System", R. Borger & F. Hlawa, pp. 22–29, Peripheral Line/Trunk groups etc.
International Conference on Communications, vol. 2, Jun. 4–7, 1978, Toronto, Canada, Terry et al.-DM-S-200 Traffic peripheals, pp. 32.3.1 to 32.3.6.

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A group of terminal units (GUT) for a digital exchange having distributed control residing in control means comprising microprocessor control units (UC) which are interconnected by means of the exchanges' time switching network (RXA to RXD). The control units UC are connected to each other by a duplicated point-to-point link (RIT1, RIT2) and to the switching network by a coupler (AM) which is provided with a send-/receive circuit that operates using a semaphore procedure. Each of the terminal units (UT) includes a control microprocessor (mp) connected to the switching network by a send-receive circuit (ER) using a semaphore, or question and answer, procedure. The terminal units (UT) are controlled by the control units (UC) by interchanging messages using a common procedure for all the terminal units. These messages are interchanged over channels in the links that make up the switching network of the exchange.

7 Claims, 13 Drawing Figures

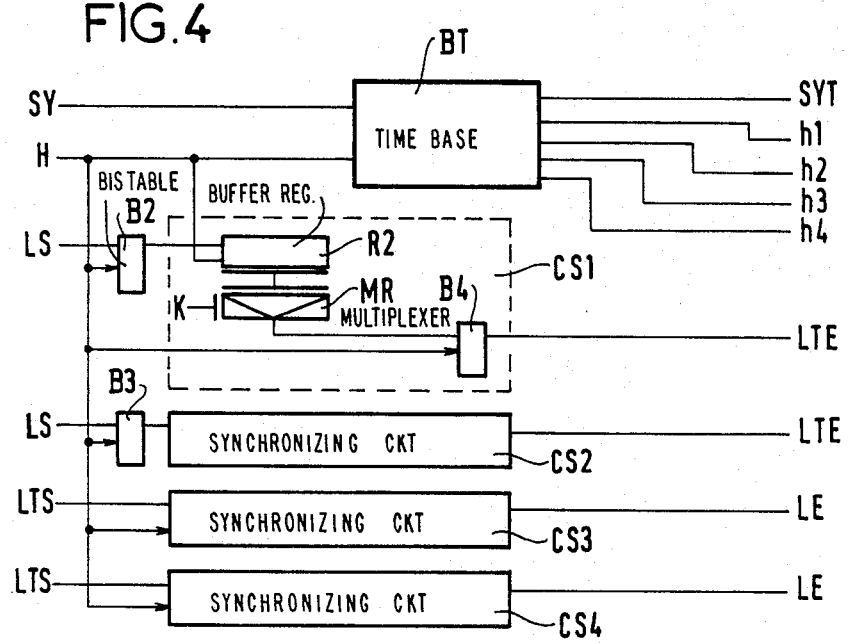
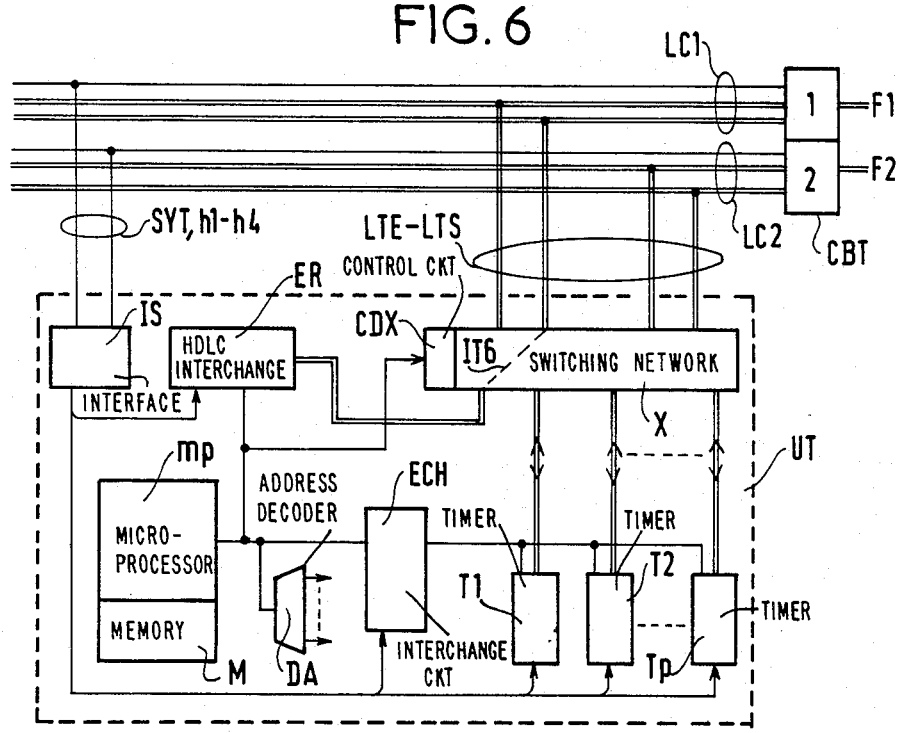

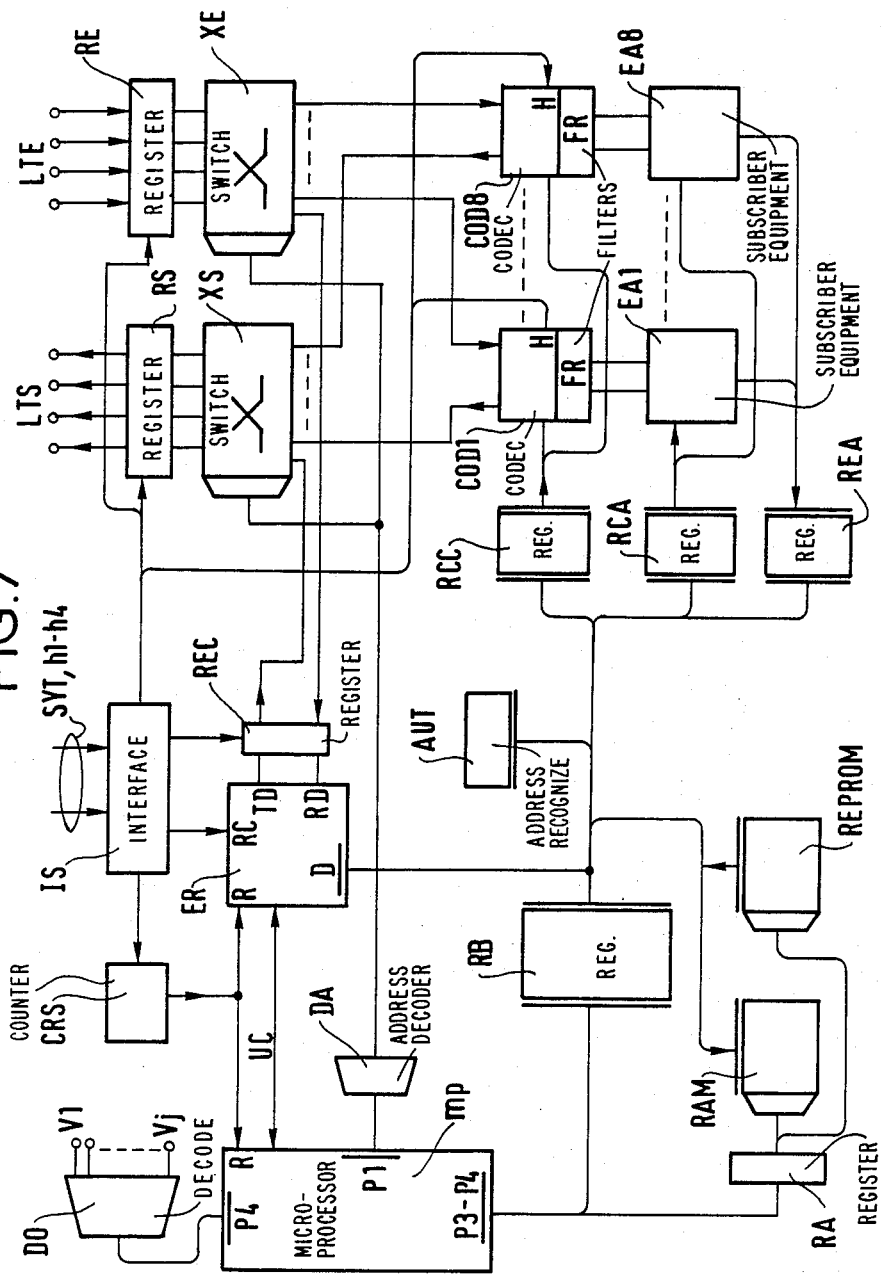

GROUP OF TERMINAL UNITS FOR A DIGITAL EXCHANGE

The invention relates to a group of terminal units for a digital exchange. It is applicable to the telecommunications industries, and in particular to telephone switching and to switching telematic services.

BACKGROUND OF THE INVENTION

There are many known types of groups of telephone equipment which include control logic, for example a microprocessor, which performs a certain number of tasks locally and interchanges data with main control units of the exchange.

These groups have been made to meet various targets: physically independent groups for use in a distant location, modularity, offloading repetitive functions from the central control, etc.

In particular a large number of recent applications concern the provision of groups of terminals for systems in which the main control is itself distributed.

The advantages of this type of control are known, in particular its modularity and its flexibility in implementation. Such a system is described, for example, in an article by SHIMASAKI entitled "A Versatile Digital Switching System For Central Office NEAX 61" (Proceedings of the ISS-79 Paris Colloquium, volume 2 pages 688 to 695).

Another distributed control system is described in the Applicant's French patent application No. 81-06807 entitled "A Time Division Exchange With Distributed Control". In this system the main control is distributed, and for the terminal units, the control is distributed between interchangeable control units.

An important advantage of the system is to have all the telephone equipment of the system, lines, circuits, signalling equipment, etc., grouped together in the terminal units.

However, known systems have two drawbacks associated with their control and with the means for connecting the terminal units, and these drawbacks reduce the advantages of distributed control.

Firstly, the nature and bulk of the terminal units are very varied, and using an identical control interface for all of them imposes a penalty.

Secondly, for their connection, the terminal units are distributed in groups which are not functional entities and which therefore lose the advantages of flexibility, particularly concerning their security.

Preferred embodiments of the present invention provide groups of terminal units which, while retaining the notion of independent units, make use of an overall interface and share connection means, with the group forming a functional assembly.

SUMMARY OF THE INVENTION

The present invention provides a group of terminal units in an exchange which comprises a switching network having four independent planes of time switches controlled by markers, the terminal units being organised into groups connected to the switching network and each terminal unit including a microprocessor together with terminals each of which is constituted by some specific piece of exchange equipment—in particular for telephone switching: subscriber equipment, line equipment, signalling equipment, test equipment, . . . —the switching network also having distribution modules for distributing clock signals and synchronising signals connected thereto and control units for controlling and managing the terminal units and the distribution modules, the improvement wherein each group of terminal units comprises two clock and synchronisation circuits each having a time base connected to a distribution module, first and second synchronisation circuits each connected to a plane of the switching network via a terminal inlet link, and third and fourth synchronisation circuits each connected via an inlet link to each of the planes to which the first and second synchronising circuits are connected, and via a terminal outlet link to the terminal units, and wherein the control of a terminal unit by a control unit is performed by interchanging messages between the microprocessors of the terminal unit and the control unit, said interchange taking place over the switching network using a question and answer, or semaphore, procedure on one of the time slots on said inlet and outlet links and said terminal inlet and outlet links.

BRIEF DESCRIPTION OF THE DRAWINGS

A telephone exchange embodiment of the invention is described by way of example with reference to the accompanying drawings in which:

FIG. 4 is a circuit diagram of a time base;

FIG. 6 is an outline diagram common to all the terminal units;

FIG. 7 is an outline diagram of a terminal unit for subscriber equipment;

DETAILED DESCRIPTION OF THE INVENTION

Figure 1:
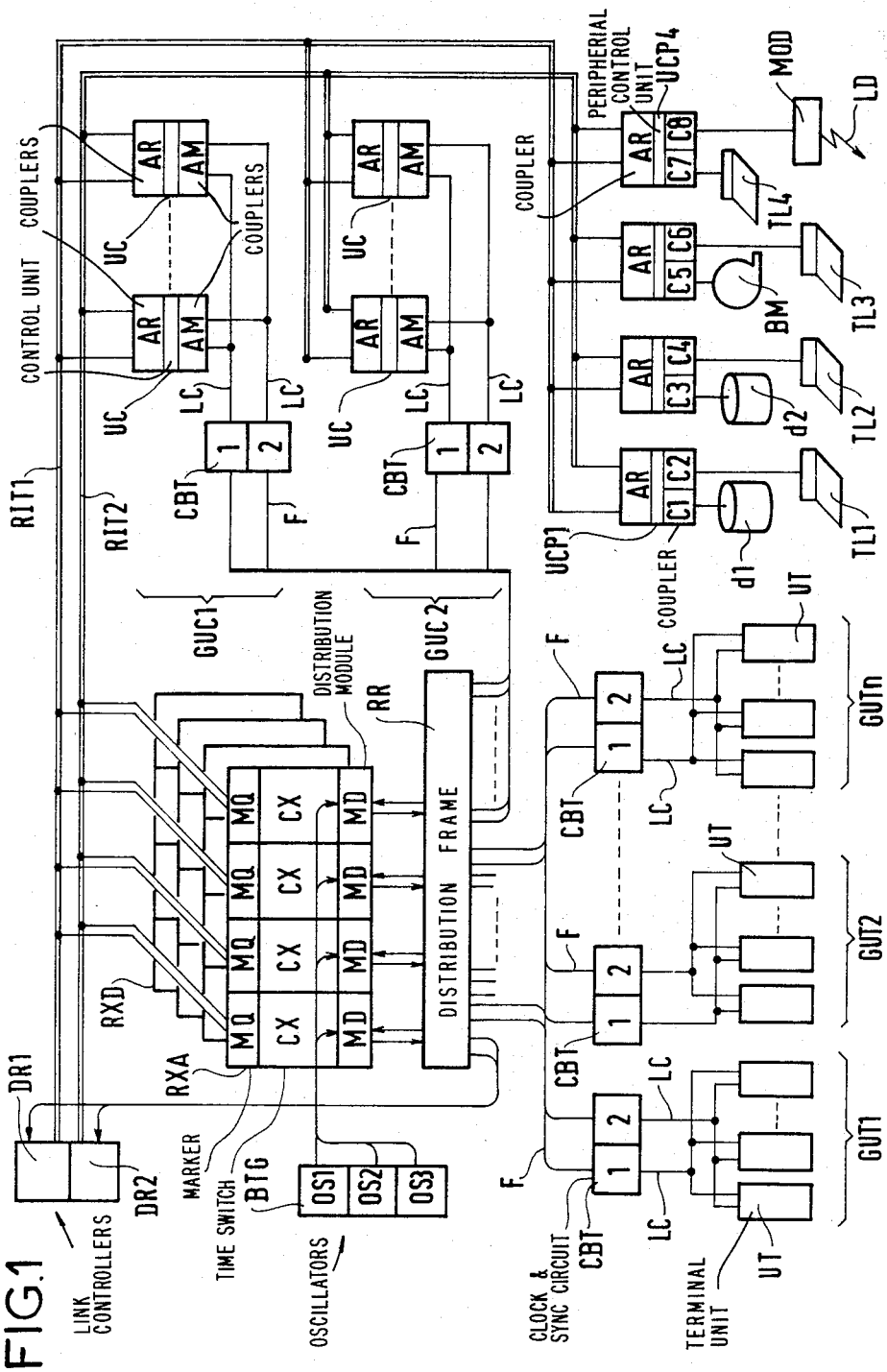
FIG. 1 is a general block diagram of the exchange.

The time-division exchange shown in simplified manner in FIG. 1 comprises the following members:

(1) Groups of terminals units GUT1 to GUTn comprising subscriber terminal units UT, analog and digital circuits UT, and auxiliary terminals for signalling, for applying tones and recorded announcements to subscriber lines, for testing subscriber lines and circuits, for conference circuits, etc.

(2) A central switching network having a single stage of switching. The network is organised in independent planes, e.g. four planes RXA to RXD. The figures given in this description are merely by way of example and to simplify the drawings.

(3) Exchange control means of distributed architecture constituted by groups GUC1 and GUC2 of identical control units UC each comprising a microprocessor. The control units are interchangeable. The control means also includes one or more peripheral control units UCP1 to UCP4. These control units may be identical to the preceding control units, but they cannot be totally interchangeable on account of their couplers C1 to C8 providing physical connections with the peripherals (disks d1 and d2; dialog terminals or computer-type controls TL1 to TL4; magnetic tape transports BM; and data links LD using modems MOD.

The above three portions of the exchange are interconnected as follows:

(1) The terminal units UT are connected to each of the planes RXA to RXD of the switching network via multiplex links, e.g. multiplex links each comprising 32 time slots which are 8 bits wide. There are thus four multiplex links, and the terminal units of each group are connected in parallel to the four multiplex links.

(2) The control units UC are likewise connected to the switching network via multiplex links, with one multiplex link per group GUC to each plane of the network. Messages interchanged between control units UC and terminal units UT are transmitted via time slots in the multiplex links which are connected by the switching network in a semipermanent and reconfigurable manner. Data transmission channels are thus provided having a data rate of 64 Kbits/sec. which are used according to the so-called HDLC procedure defined in the CCITT's standard 150.

(3) The control units UC and the peripheral control units UCP are interconnected by point-to-point links RIT1 and RIT2 which are doubled up for safety reasons. They are serial links which likewise use an HDLC procedure. Access to these links is managed by a duplicated controller DR1, DR2 which authorises transmission thereover and which supervises the durations of such transmissions.

Each link RIT1 and RIT2 comprises five pairs of wires going to each station connected thereto, for the purposes of calling, authorisation, clock transmission, signal transmission, and signal reception.

Each plane RXA to RXD of the central switching network comprises four time switches CX for example, each of which is associated with a marker MQ and with a signal distribution module MD. Each marker MQ comprises a microprocessor. The markers are controlled by the control unis UC via the point-to-point links RIT1 and RIT2.

All the above mentioned units: UT, UC, UCP and MQ are provided with respective send/receive circuits for interchanging HDLC type messages, e.g. an MC 6854 type circuit manufactured by MOTOROLA or an 8273 circuit manufactured by INTEL.

The control units UC and the peripheral control units UCP have access to the links RIT1 and RIT2 via couplers AR, and the control units UC have access to the PCM channels via couplers AM. The couplers AR and AM provide semaphore mode access, and they may, for example, be of the type described in the Applicants' above mentioned French patent.

The terminal units include a miniature switching network for connecting the terminals to the multiplex links going to the main switching network. They are controlled by a microprocessor which communicates with the control units UC by means of an HDLC circuit, for example one of the circuits mentioned above. The groups of terminals units in accordance with the invention are described further on.

Figure 2:
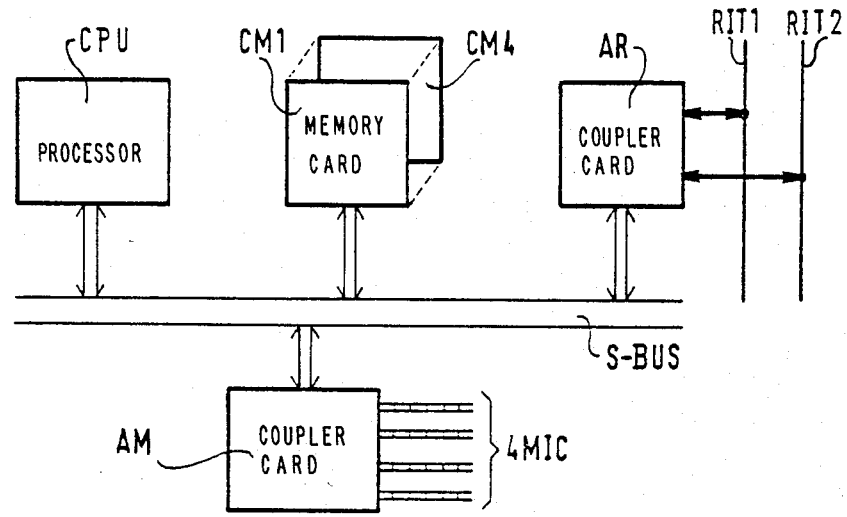
FIG. 2 is a diagram of an interchangeable control unit.

A control unit UC is shown diagrammatically in FIG. 2.

A control unit UC comprises the following members connected to a system bus S-BUS:

(a) a microprocessor card CPU;
(b) memory cards such as CM1 to CM4;
(c) a coupler card AR connected to the links RIT1 and RIT2; and
(b) a coupler card AM connected to the four PCM multiplex links which serve a group GUC.

The microprocessor is given access to the bus system S-BUS and to an internal bus for managing the resources available on the card CPU, namely read only memory containing initialisation programs, read/write memory, registers, and timing means. The microprocessor may, for example, be an INTEL type 8086 circuit.

The programs are distributed by the nature of the system. It is organised as logical machines, which are sub-assemblies of the program as a whole, and which are viewed as being independent control units that communicate with their environment only by exchanging messages. The logical machines correspond to logically independent functions: processing telephone calls, managing files, interpreting operator commands, timekeeping, . . .

Thus, from the user point of view the control means is replaced by a network of logical machines. This generalisation of the equipment architecture is due to two considerations:

(1) The control units have to communicate by messages since they do not share any memory in common; and
(2) A distinction is drawn between a logical machine and a physical machine since, for reasons of cost, several independent functions may be grouped on a single control unit in order to miximise use of its memory and its computing power. The functions are grouped together when the system is generated.

Some logical machines may be repeated in several microprocessors. For example there may be 1 to 32 logical machines for processing telephone calls, with each of them dealing with some number of subscribers and circuits to other exchanges. The capacity of the exchange can thus be increased by adding extra control units.

The logical machines are addressed by name rather than by a physical address. A message is sent to a logical machine in the same manner regardless of whether the destination logical machine is in the same control unit or in another. Thus, reconfigurations are transparent to most programs.

The logical machines have the following characteristics:

(1) There are units for setting up links and for loading;
(2) There is a set of tasks (asynchronous processes);
(3) Messages are addressed to tasks in the logical machines;
(4) Each task has two message queues associated therewith: one request queue and one queue of replies to requests; and
(5) The tasks within a single logical machine may likewise communicate with each other by exchanging messages.

The operating system is constituted by a resident kernel which is repeated in each control unit. It includes:

(1) An initialisation sequence in read only memory capable of loading the rest of the resident kernel on initialisation; and
(2) A system SGTE for managing tasks and interchanges which constitute the heart of the operating system. This system is itself constituted by two subassemblies:

(2.1) A set of services that serve to manage interchanges, the memory, and the tasks. This set of services comprises primitives that are called by the logical machines:
  (a) message sending;
  (b) waiting for requests and replies;
  (c) connection to an interrupt procedure (such a procedure communicates by means of messages with the other tasks of the logic machine to which it belongs; and
  (d) reading various data: time, number of the current task, . . .

(2.2) A superviser logic machine which is always included in each microprocessor on starting up. The supervisor logic machine provides services connected with managing the microprocessor, and in particular:
  (a) loading a logical machine in a control unit and activating it;
  (b) indicating where to find the logical machines placed in other microprocessors;
  (c) removing a logical machine;
  (d) restarting a control unit; and
  (e) updating its clock.

Further, the supervisor logic machine provides test and security functions for the control unit and for managing the data, and also includes debugging functions.

By distributing the program in the form of logical machines and tasks that communicate with each other via messages with the destination being recognised by an identity code (logical machine number, task number) which is independent of the physical location thereof, it is possible to configure the system in one configuration initially and then to reconfigure it after a modification or a breakdown in the control unit.

To do this, the location of logical machines is controlled by a logical machine for managing the control network MLR, i.e. the exchange control means, the point-to-point links RIT1 and RIT2 and the link controllers DR1 and DR2. To discover the state of a system and to control its reconfiguration, the management logical machine MLR periodically interrogates all the microprocessors. A maintenance task is located in each microprocessor and it performs internal tests to indicate the state of the processor to the management logical machine MLR.

The entire software is stored on duplicated disks for security reasons. The disks are controlled by different microprocessors. On initialisation, the two microprocessors controlling the disks have an initialisation sequence which decides by timed interchange of messages which of them is to start first and become the master microprocessor. The initialisation sequence of the master is loaded as follows:
(1) The system SGT for managing tasks and interchanges;
(2) A logical machine for file handling; and
(3) The logical machine for managing the control network.

The organisation of the groups of terminal units will now be described; they comprise the following means:
(a) Parallel connections to the other members of the exchange (the switching network, the control unit UC, the time base);
(b) Structure means internal to the terminal unit; and
(c) Interfaces for exchanging messages with the managing processor (UC).

For reasons of security and terminal modularity, the links between the central switching network and the groups of terminal units GUT and control units GUC are organised as parallel connections F (FIG. 1) each parallel connection including two multiplex links, one link for distributing clock signals and one synchronising link. The parallel connections F are connected to the switching network distribution frame RR, and in each group of terminal units GUT and in each group of command units GUC they are connected to a duplicated synchronising and clock circuit CBT.

Each group is connected by two parallel connections F distributing four multiplex links giving access to the four planes of the switching network.

Each synchronising and clock circuit CBT distributes all the signals to the units of the group, via a common duplicated link LC comprising two multiplex links.

A general time base BTG comprises three oscillators OS1 to OS3. It may, for example, be of the type described in the Applicants' French published patent specification No. 2 390 856.

Each oscillator delivers a clock signal H1, H2 or H3 together with a frame synchronising signal SY1, SY2 or SY3 at a frequency equal to the frame frequency of the multiplex link.

The synchronous distribution of the clock signals and synchronising signals to all the members of the exchange is performed by signal distribution modules MD (FIG. 1) which perform a majority choice between pairs of clock signals and synchronising signals received from the three oscillators, together with error checking, and distribution towards r destinations, via r links D1 to Dr per module.

Figure 3:
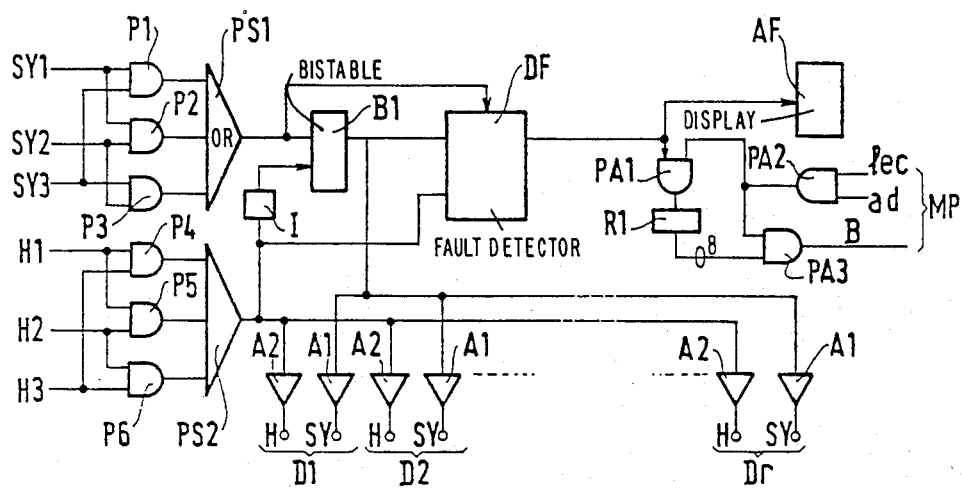
FIG. 3 is a circuit diagram of a clock distribution module.

FIG. 3 shows an example of a signal distribution module MD. The synchronisation signals and the clock signals from the three oscillators are respectively received by two majority choice circuits, each of which comprises three AND gates P1, P2, P3 or P4, P5, P6 as the case might be connected to respective inputs of an OR gate PS1 or the synchronisation signals and an OR gate PS2 for the clock signals.

The OR gate PS1 is connected to amplifiers A1 via a bistable B1 which is clocked by the falling edge of the majority signal from the gate PS2 via an inverter I1. A fault detector DF is connected to the output from the gates PS1 and PS2, to the output from the bistable B1 and to the input to a display AF for providing a warning of distribution faults. Naturally the oscillators have their own fault detection means. An interchange register R1 and access providing AND gates PA1 to PA3 serve to supervise the distribution module MD from an associated microprocessor MP. In a preferred embodiment, the modules MD are situated in slots in the switching network, and they are supervised by the microprocessors in the markers.

At the groups of terminal units GUT, each clock circuit and time synchronising circuit CBT is connected to a distribution module MD and to two multiplex links MX, in other words to two outlet links LS and to two inlet links LE. The two circuits CBT of each group are connected to different planes in the switching networks and to independent modules MD. The circuits CBT include an internal time base circuit BT which generates synchronising signals SYT and clock signals h1 to h4 as required by the terminal units UT, and also by the synchronising circuits CS1 to CS4 of the multiplex links (FIG. 4).

The synchronising circuits CS1 and CS2 are inserted between the two outlet multiplex links LS and the two inlet multiplex links to the terminals LTE. The synchronising circuits CS3 and CS4 are inserted in between the two outlet multiplex links from the terminals LTS and the two inlet links LE.

Further, the outlet links LS are sampled by bistables B2 and B3 driven by the clock signals H.

The synchronising circuits CS are in the form of a buffer register R2, a multiplexer MR whose address K is hardwired in such a manner as to insert a constant phase shift that depends on the type of terminal units in the group concerned, and an outlet bistable B4.

Two additional parallel connections F provide the clock signals H and the synchronisations SY from the distribution frame RR to the controllers DR1 and DR2 to enable them to generate the clock signals for the point-to-point links RIT1 and RIT2.

The two parallel links F connected to a single member are completely independent since their connections come from different planes. Further, the corresponding modules are served by separate power supplies.

The choice of active parallel connection may be made independently by the microprocessor at each terminal unit. In fact, it possesses its own local oscillator.

Figure 5:
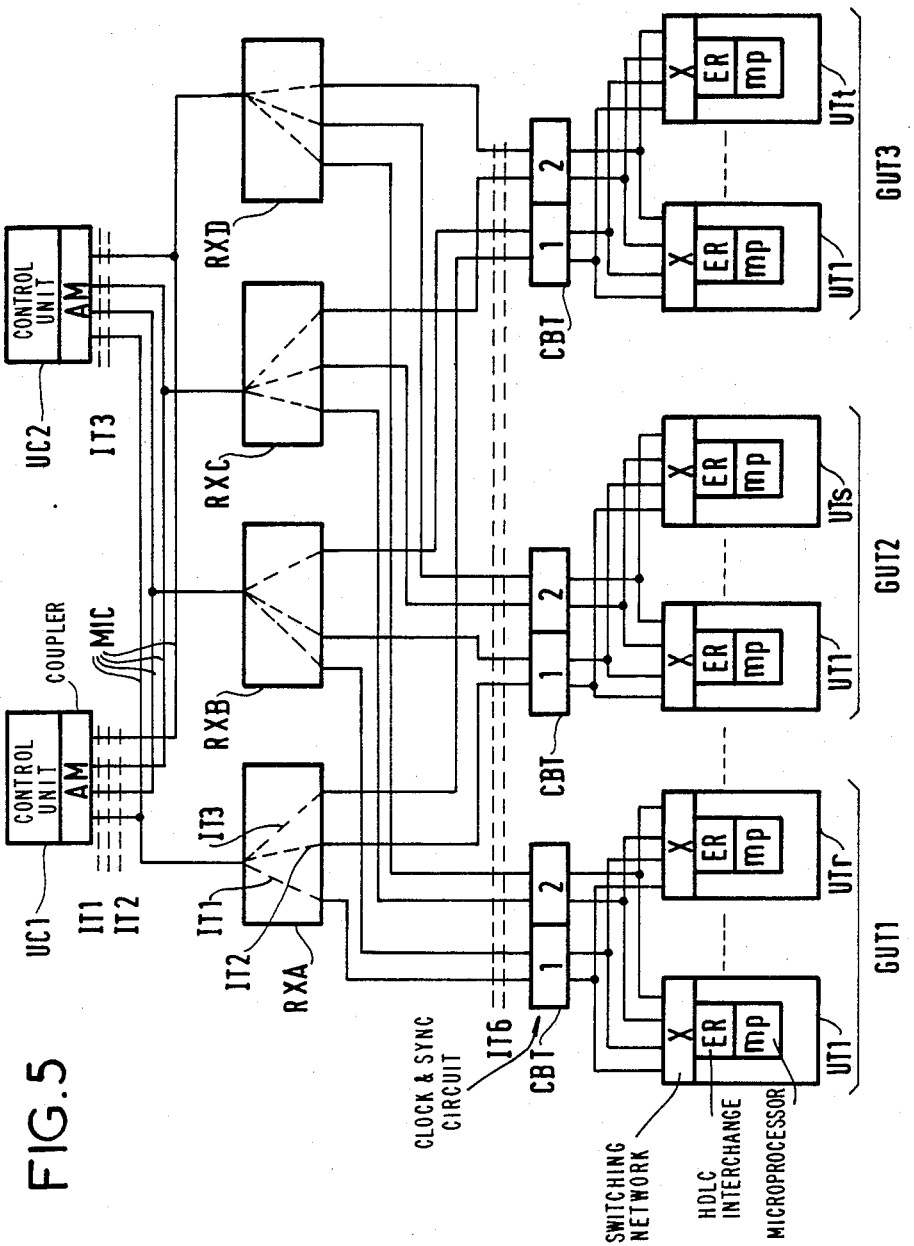
FIG. 5 is a general diagram showing the control links between interchangeable control units and terminal units.

The link channels between the groups of terminal units and the groups of control units UC are shown in FIG. 5. Three groups of terminal units GUT1 to GUT3 are shown.

The groups GUT1 and GUT2 are managed by the same control unit UC1 while the group GUT3 is managed by another control unit UC2. The units UC1 and UC2 belong to the same group GUC and thus use the same PCM multiplex links to communicate with the switching network.

In this example a coupler AM of the type described in the Applicants' French patent application No. 81-06807 is used. Each 64 Kbit per sec. channel between a control unit and one of the groups GUT uses same number time intervals IT for sending and for receiving over the four multiplex links to the switching network. IT1 for UC1-GUT; IT2 for UC1-GUT2; and IT3 for UC2-GUT3.

On the multiplex links between the switching network and a group GUT, all the interchange channels between the control units use a reserved time interval, IT6.

The messages from a control unit towards a group GUT are sent simultaneously over the four multiplex links and they arrive at all the terminal units UT. In each terminal unit, the microprocessor mp choses a listening channel and uses its miniature switching network X to establish a connection between the chosen channel and the access to the HDLC procedure interchange circuit ER.

All the messages include the number of the destination terminal which enables the terminal to ignore messages that are not intended for it.

The general structure of a terminal unit, is common to various types of unit UT described below and is shown in FIG. 6.

The miniature switching network X switches the links LTE-LTS towards the terminals T1 to Tp, and connects the circuit ER to the channel IT6 chosen by the microprocessor mp. A control circuit CDX for controlling the switching network is connected to the address bus of the microprocessor. This is connected to the terminals by an interchange circuit ECH comprising marker circuits and registers. The memory M of the microprocessor comprises a portion of read only memory and a portion of read/write memory. An address decoder DA serves to enable the various microprocessor circuits.

The synchronising signals (SYT) and the clock signals (h1 and h4) on the two links LC1 and LC2 are received by an interface IS connected to the terminals and distributed to the circuit ER to the circuit ECH, and to the miniature switching network X if it is a time division switch.

FIG. 7 shows one terminal unit for connection to subscriber lines.

The microprocessor mp and the circuit ER are, for example, MOTOROLA circuits reference MC6801 and MC68A54 respectively. Analog type subscriber equipments (EA1 to EA8) are each connected to a codec (COD1 to COD8) for performing digital to analog and analog to digital coding. The codecs are associated with inlet and outlet filters FR. On the send side, the outlet from a codec is connected to the links LTS via a switch XS and an outlet register RS. On the receive side, the links LTE are connected to the inputs to the codecs via a register RE and a switch XE.

In this example the switches XE and XS are space type matrices, with the time slot being determined by a command supplied to the codecs by the microprocessor via a register RCC. The codecs also receive clock signals from the synchronising interface IS connected to the links SYT and h1 to h4 of the parallel connections LC1 and LC2.

The switches XE and XS are controlled by the P1 outputs from the circuit 6801 via a decoder DA.

The read only memories (ROM) and the read/write memories (RAM) of the microprocessor are addressed by the P3 output and the bits 0 to 2 of the output P4 via an address register RA.

Interchanges between the microprocessor and the subscriber equipments are performed via a set of registers:

(a) A set of registers RCA for enabling the processor to control relays for applying ringing and test conditions; and (b) A set of registers REA for determining the state of the subscriber loop.

The sets of registers are connected to the outputs P3 via registers RB. The registers RB are also connected to a bus D of the circuit ER and to a circuit (AUT) for recognising the address of the terminal unit to enable it to recognise messages which are addressed thereto by the control unit UC.

Commands for activating the circuits of the terminal unit are sent via the outputs P4 to an order decoder DO. A control link LIC connects the microprocessor to the circuit ER. A supervisory counter CRS (or watchdog) is connected to the reset input R of the circuit 6801 and 68A54.

The inlets/outlets TD/RD of the circuit ER are connected to the matrices XS and XE by a register REC which is synchronised by the interface IS.

The tasks of the microprocessor MP include analysing all the messages received by the circuit ER, replying to messages addressed thereto, executing orders, analysing the loop states of the subscribers, and executing test programs for verifying that the terminal unit is functioning properly.

Data interchanges with the control unit are described further on.

An analog circuit terminal unit of similar structure to the preceding terminal unit may be used in this application of the invention. For example, the structure shown in FIG. 7 can be used for 4-wire circuits with signalling over additional wires RON and TRON. In this case, line equipments replace subscriber equipments, with the registers RLA being used to control the wires TRON and the registers REA to acquire the state of the wires RON. Given the high traffic of such lines, which may be as much as 0.7 Erlangs on average, a terminal unit UT will only be connected to four lines, so that a group GUT may comprise, for example, six terminal units UT which gives a total of 24 lines.

Figure 8:
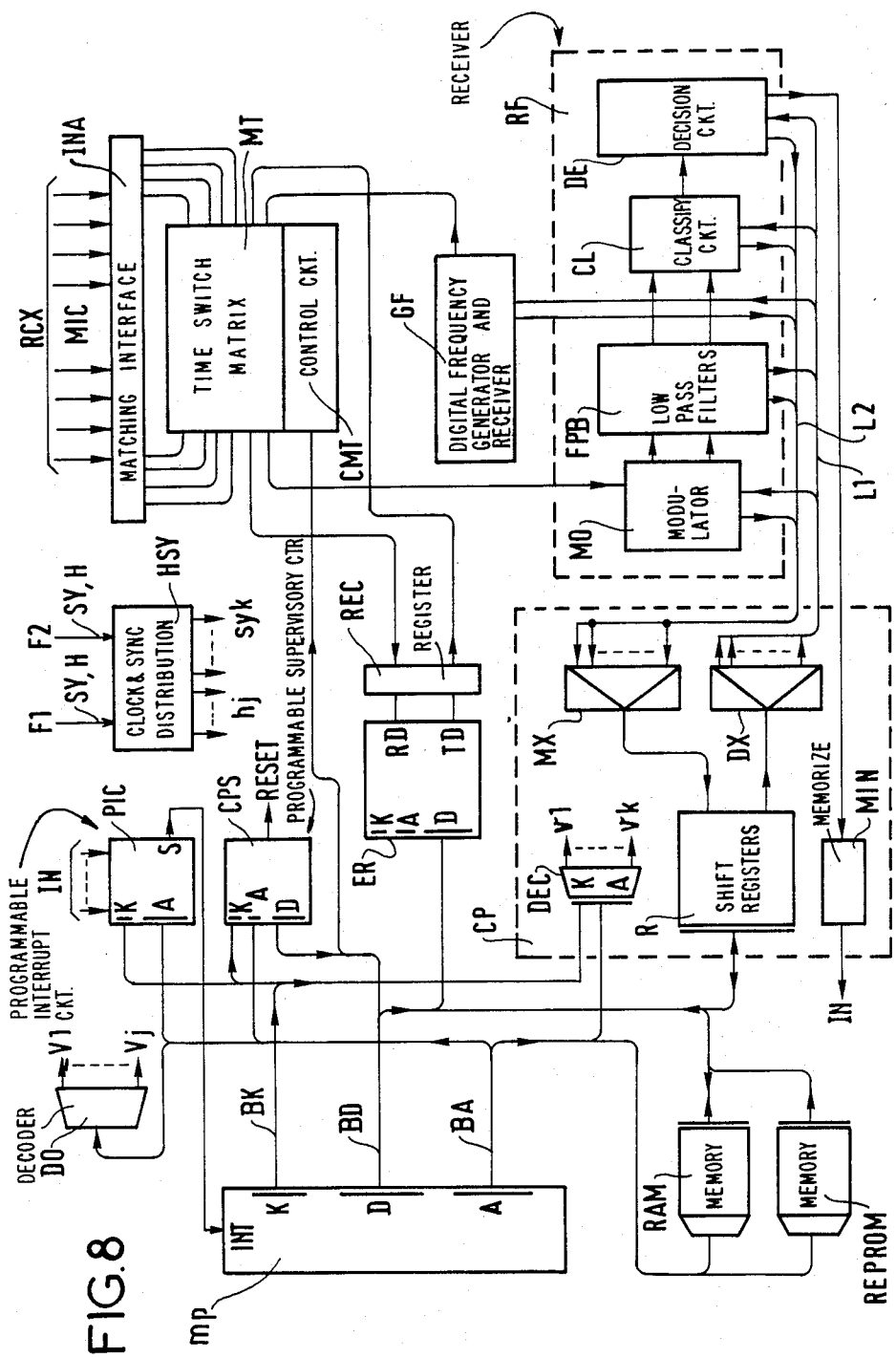
FIG. 8 is an outline diagram of a terminal unit for generating and receiving multifrequency signalling.

FIG. 8 shows a group GUT of multifrequency signalling auxiliaries. Given the high volume of information processed, the group only comprises a single terminal unit UT and its structure is different from the preceding terminal units, however its interface with the switching network and the control unit UC remain identical.

The auxiliary unit is controlled by a microprocessor, for example a MOTOROLA type MC6809, connected to memories (RAM, REPROM), to a circuit ER (for example a 68B54), to a programmable interrupt circuit PIC (for example a 6828), and to a programmable supervisory counter CPS (for example a 68B40).

The circuits are connected in known manner to the microprocessor bus mp: the address bus BA, the data bus BD and the control bus BK.

The digital frequency generator and receiver may for example be of the types described in French patent application No. 80-103572 entitled "A Digital Frequency Sender Controlled By a Processor" and No. 80/14090 entitled "A Digital Frequency Receiver", both in the Applicants' name. The generator GF is capable of sending combinations of frequencies in 8 different codes over the 30 channels of a mutiplex link. The receiver RF can receive 64 different signalling codes over the 30 channels of a multiplex link. The receiver transposes the frequency of the signals by means of an internal generator which produces the frequencies of the codes used, followed by a low pass filter and means for analysing the energy at the outlet from the filters. To do this it comprises a modulator circuit MO, a group of low pass filters FPB, a classifying circuit CL for classifying the frequencies of greatest energy, and a decision circuit that performs a degree of checking on recognised signals.

In the application described, the auxiliary unit is directly connected to the parallel connections (F1, F2) to the switching network RCX, and it thus includes the functions of the synchronising and clock circuits CBT described earlier on.

The multiplex links are connected by a matching interface INA to a time switching matrix MT controlled by a circuit CMT. For example, a matrix of the same type as used for the switches CX in the switching network may be used as described in the Applicants' French patent application No. 81/06809 entitled "A Distributed Network".

The matrix MT switches the channels of the four multiplex links which serve the auxiliary unit to connect them to the channels of the multiplex links connected to the receiver and to the generator and to connect them to the send and receive channels of the circuit ER.

FIG. 8 shows a clock distribution circuit and a synchronising distribution circuit HSY which serves the various circuits of the auxiliary unit, with signals Hj and syk being generated from the signals H and SY received over the parallel connections F1 and F2.

Information is interchanged between the microprocessor and the receiver described in application No. 80/14090 mentioned above, and between the microprocessor and the generator, as follows:

(a) The microprocessor mp loads the code numbers allocated to the channels in a circuit memory MO;
(b) The code numbers and the frequency numbers attributed to the channels are loaded in a memory of the generator;
(c) The memory is re-read by the microprocessor;
(d) Testing and simulation: the inlet register to the circuit MO is loaded and re-read;
(e) Testing and simulation of other circuits (FPB, CL and DE) and of the generator; and
(f) Data transmitted by the circuit DE to the microprocessor concerning the frequency signals as received and analysed.

These interchanges of information are performed over the serial links by a coupler CP comprising a group of shift registers connected to the microprocessor bus BD and to the multiplexers MX and the demultiplexers DX giving access to the serial links (L1, L2) for both-way communication with the receiver and the generator.

To send signalling information to the microprocessor, the circuit DE sends an interrupt request to the circuit PIC, which request is relayed in the coupler via a memorising circuit MIN.

The coupler is driven by a decoder DEC connected to the buses BA and BK.

The functions performed by the microprocessors are as follows:
(a) Analysing the messages received by the circuit ER using the HDLC procedure;
(b) Executing orders from the control unit UC; frequency send commands; receiver connection command; and test program execution;
(c) Processing the part processed signals supplied by the receiver on an interrupt requested by the receiver;
(d) Sending messages to the control unit indicating the recognised frequencies; and
(e) Fault processing:
  programs for determining the location of the faulty card; and
  fault messages sent to the control unit.

Interface for exchanging messages between groups of terminal units GUT and a control unit UC The equipment described above makes it possible to use the same interface with the same data interchange protocol for all the groups GUT.

By way of example, there follows a description of the interface used in an exchange of the type described in the above mentioned French patent application No. 81/06807.

The multiplex link couplers (AM) of the control units UC include a sequencer which sends the orders from the control unit UC to the groups GUT and which acquires the responses and other information emitted by the groups GUT using a polling procedure. The interchanges between the coupler AM and the microprocessor of the control unit are managed by the control unit by a logical machine referred to as the interchange handler. The control channels require the following conditions when in use:

(a) Dialogue occurs following a question and answer procedure with the coupler being the master and the group GUT the slave;
(b) The coupler sends each command to a group GUT simultaneously on all four multiplexes using the same time slot number;
(c) The protocol serves to avoid losing information where possible;
(d) The question and answer mechanism described below avoids losses, duplications or inversions of messages; and
(e) The repeat mechanism provides protection against loss by transmission errors.

There are only two types of normal information interchange sequence UC-GUT:

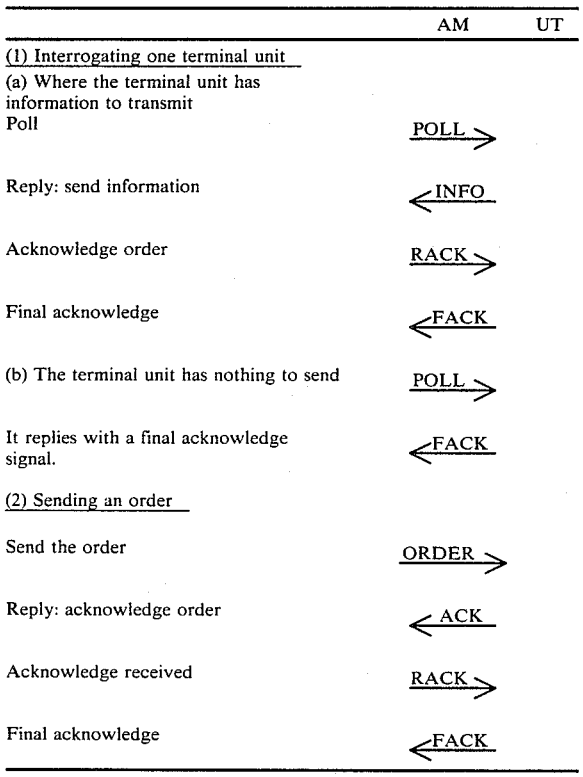

In each terminal unit, these interchanges are managed by a program in ROM which enables the clock to be changed and enables the channel being monitored to be changed and which uses two timeouts.
(1) A first timeout T1, referred to as a "rapid" timeout which is reset each time the terminal unit UT detects a flag-address configuration on the monitored channel whether or not the address belongs to the terminal unit UT in question. This timeout overflows to indicate a complete absence of a message from the control unit on the channel and causes switching of the channel being monitored.
(2) A second timeout T2 which is slower than the first timeout and which serves as a protection against a particular kind of fault in which flag-address sequences circulate on the channel being listened to without there being any useful message (a bit fault in a memory location in a plane of the switching network).

When this timeout overflows the terminal unit UT must perform a complete examination of the validity of the message received even if the message was not intended for it and it must switch if the message is incorrect.

The microprocessor of the terminal UT also manages a file of order messages and in the event of overflow the message is not taken into account. The absence of a reply will cause the order to be repeated by the control unit UC.

Figure 9:
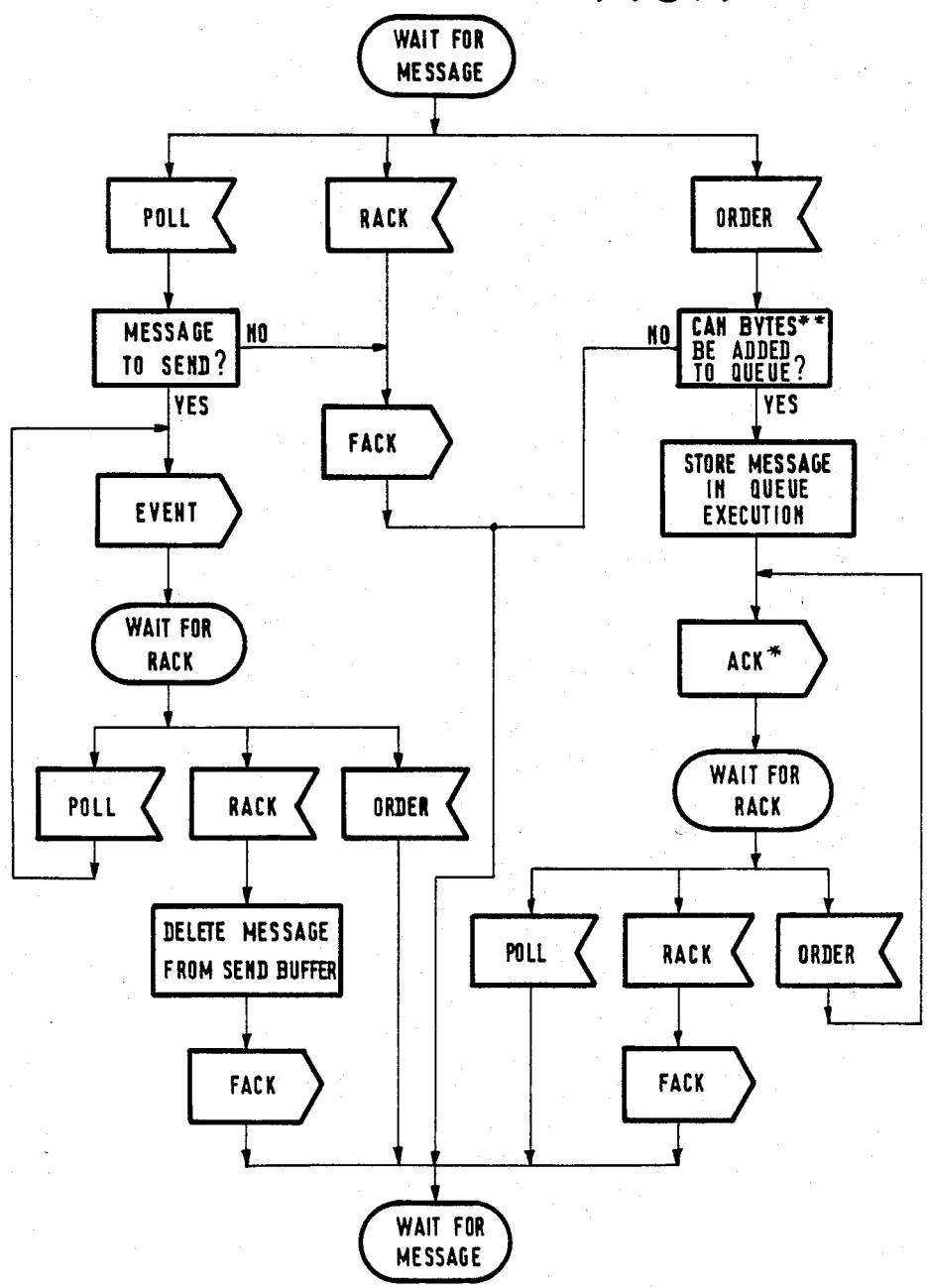
FIGS. 9, 10 and 13 are flowcharts for the control interface seen from the terminal unit end.
Figure 13:
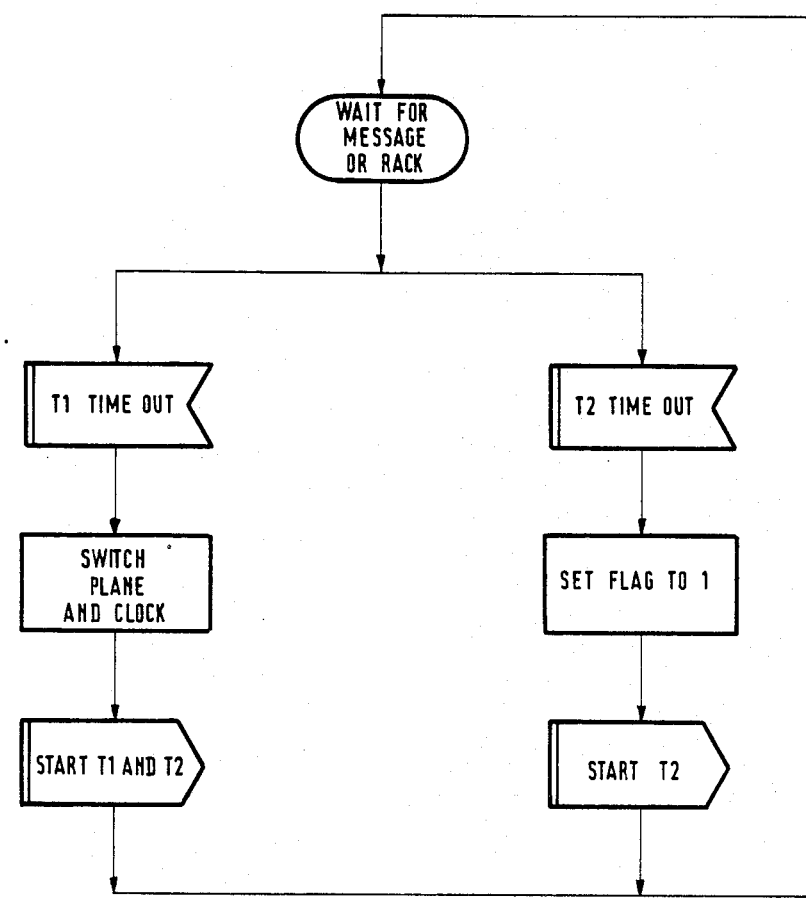

FIG. 9 is a flowchart showing how messages are taken into account by a terminal unit UT. FIG. 13 is a flowchart showing how the timeouts are used.

Figure 10:
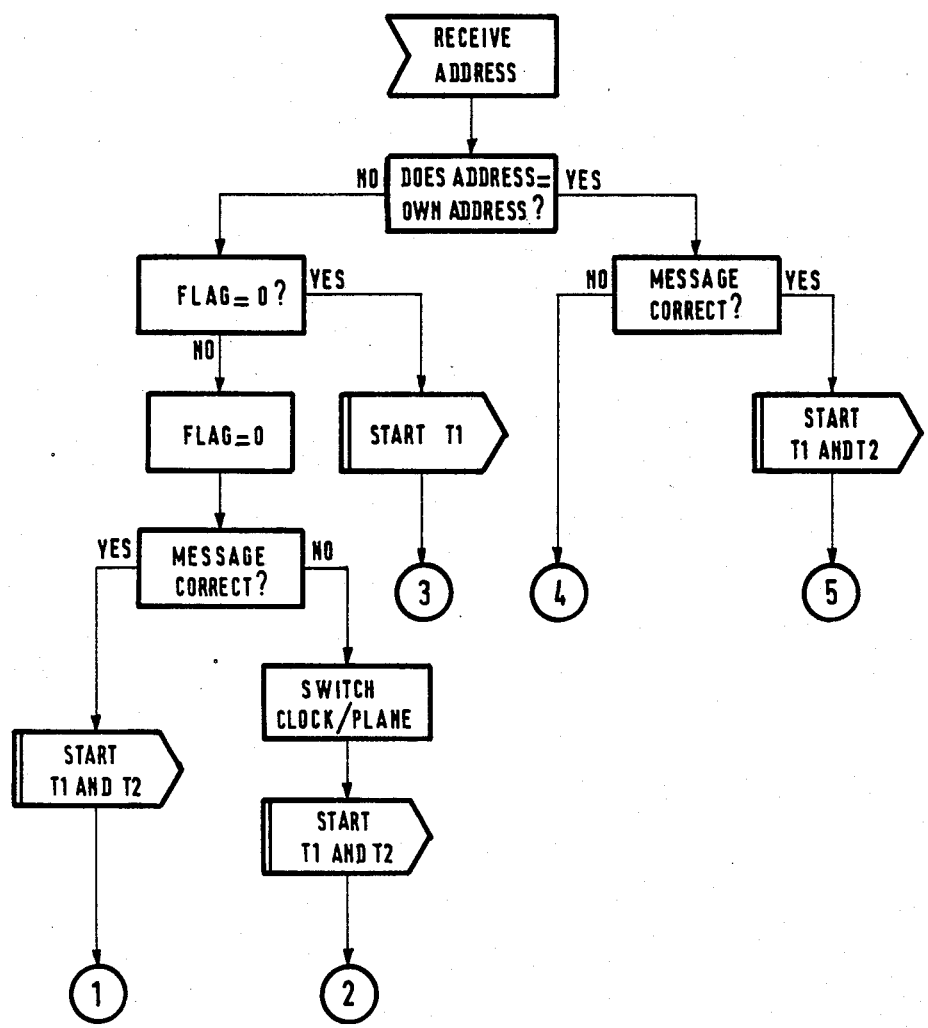

FIG. 10 is a flowchart showing how various different cases are dealt with:
(a) The flag is set to 1 by the microprocessor when timeout T2 overflows; this serves to check whether it is reasonable to remain for the duration of a period T2 without a message destined to the terminal unit UT in question.
(b) Branches 1, 3 and 5 corresponding to satisfactory operation;
(c) A branch 4 which corresponds to an erroneous message: the failure to reset the timeout T1, in the event of the error being repeated, will cause the channel being listened to to be switched; and
(d) A branch 2 which corresponds to the detection of an anomaly.

Each time the channel being listened to is switched, the terminal unit simultaneously changes the clock distribution and the channel using the following algorithm:

| Clock | Plane | |
|-------|-------|---|
| 0 | 0 | Starting configuration |
| 1 | 3 | |
| 0 | 1 | |
| 1 | 2 | |
| 0 | 3 | |
| 1 | 0 | |
| 0 | 2 | |
| 1 | 1 | |

These changes take place without taking into account whether one or other of the new items chosen is unavailable. Thus under most adverse conditions a whole series of switches could take place.

However, except in the exceptional event of the system being highly degraded, a terminal unit UT will normally be able to re-establish contact after a maximum of five consecutive switches. The algorithm shown above helps maintain this condition for a system with only two switching planes, planes 0 and 3 being equipped).

There follows a description of the protocol seen from the coupler of a control unit UC.

This protocol provides protection against various kinds of fault and breakdown:
(1) Losses and duplications of messages, loss of contact: the question and answer mechanism controlled by the coupler enables faults in the received messages to be detected and signalled. The above mentioned handler logical machine manages the fault messages and interrupts requested by the coupler;
(2) Transmission errors.

Transmission errors are shown up by a missing acknowledgement signal from the terminal unit UT. This failure to reply causes a timeout to overflow after being started when the message was sent by the coupler. In this event, the message is resent to the faulty terminal unit UT, with a maximum number of successive retries being set to a threshold value. If the threshold is exceeded an interrupt is generated.

The duration of the timeout must cover the time taken to send the message to the terminal unit, time taken for it to be received and taken into account, and the time taken to send and receive the reply.

The maximum number of retries is limited to a threshold. To avoid these protective procedures taking place in cascade at the control unit and at the terminal unit UT, the threshold chosen must leave the terminal unit UT time to switch over to a different channel and a different clock as explained above. By way of example, the following values are used for different kinds of data:
(1) The poll cycling = 50 milliseconds;
(2) Maximum number of switchovers = 5;
(3) Timeout before retrying = 22 milliseconds;
(4) Maximum number of retries = 15.

The coupler also regulates the flow of messages by means of a send queue and a receive queue on each channel:
(1) Receive file saturation.

The handler is warned by an interrupt and switches the channel m concerned into an RACK DISABLE state which it is disabled from sending RACK signals. In this state, information coming from the terminal units UT is no longer added to the queue so it is periodically retransmitted by the terminal units UT. The terminal units UT are prevented from changing the channel over which they are trying to communicate by the continuous polling. The RACK DISABLE state must last long enough to enable users to empty the receive queue, but not so long as to cause other queues in the system to saturate. A duration of about 300 to 500 ms seems reasonable. To reduce the number of occasions on which this queue saturates, fault messages are not added to the queue on a polling fault interrupt or on a control interrupt, and ACK messages (command received acknowledgements) are not put in the receive queue.
(2) Send queue saturation.

The handler logical machine refuses to add new commands to the queue and warns the user which retains the possibility to decide either to abandon the command and release the associated communication capacity or else to wait and try to reinsert the command in the queue.

Figure 11:
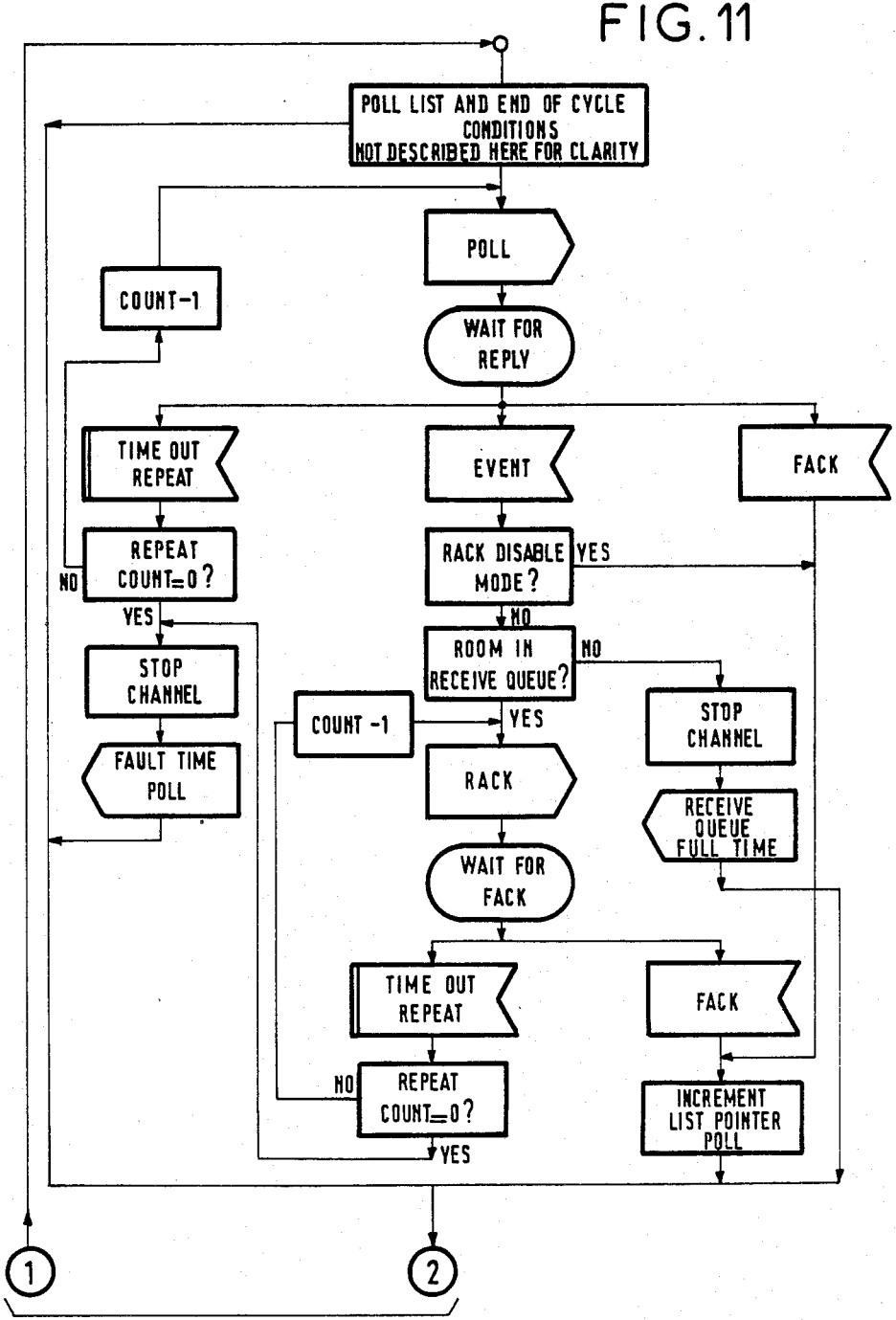
FIGS. 11 and 12 are flowcharts for the control interface seen from the interchangeable control unit end.
Figure 12:
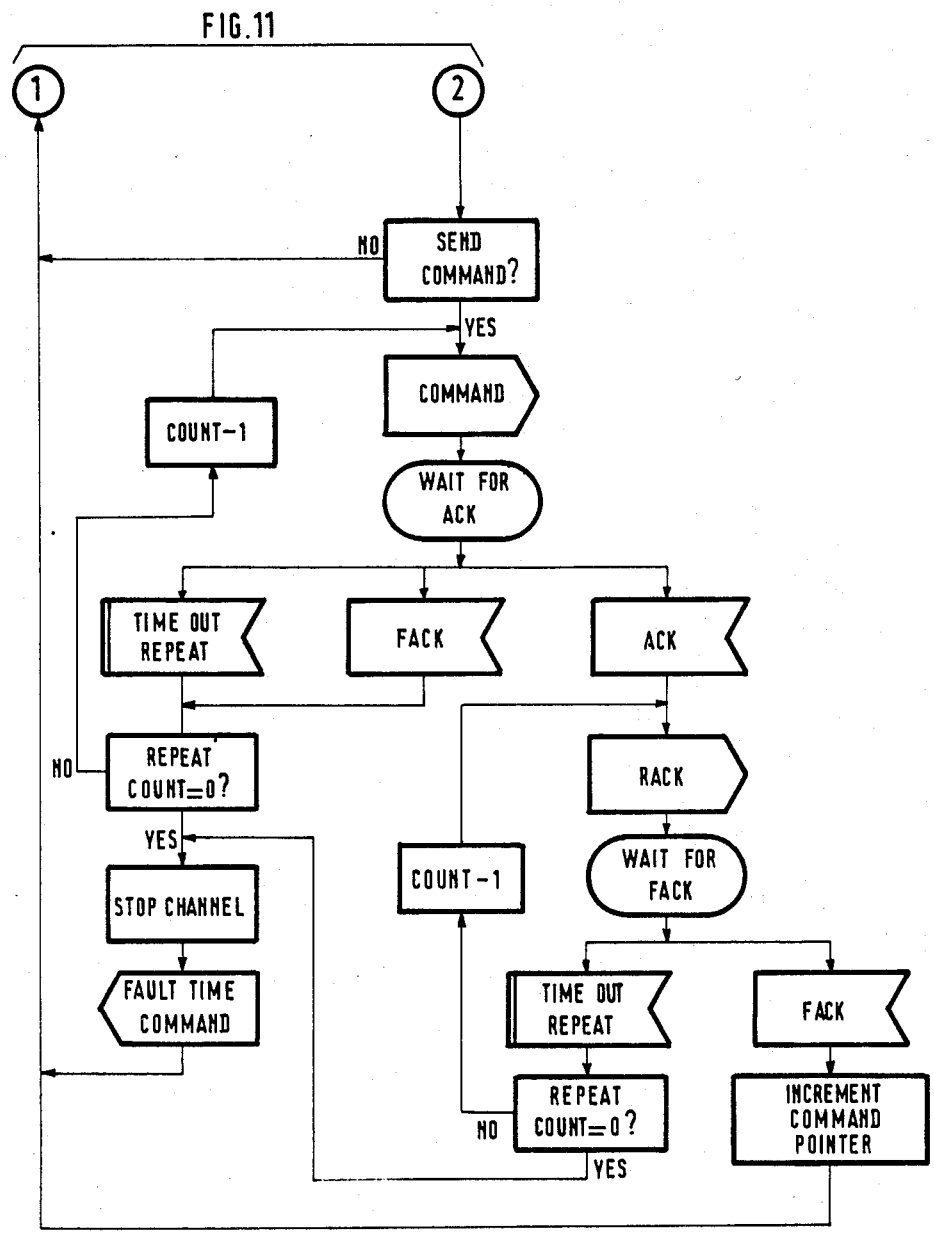

The flowcharts of FIGS. 11 and 12 describe the management of messages by the coupler sequencer:
(1) The event timeout, "repeat" corresponds to the timeout for waiting for a reply from the terminal unit UT overflowing. It causes a retry counter to be decremented. When this counter reaches zero the channel is stopped and an interrupt is sent indicating a fault;
(2) The command pointer is a pointer to the queue of messages to be sent. It is only incremented if the command has been both sent and correctly received. This ensures that in the event of a fault, the command in question will be used at the next attempt at a retry.
(3) The appearance of a poll fault interrupt or of a command fault interrupt or of a queue overflow interrupt is accompanied by the channel being stopped. This makes it possible to diagnose which terminal unit is faulty.
(4) The branch 3 in FIG. 11 corresponds to the end of the polling cycle through the terminal units by the interface AM.

We claim:

1. A group of terminal units in an exchange which comprises a switching network having four independent planes of time switches controlled by markers, the terminal units being organised into groups connected to the switching network and each terminal unit including a microprocessor and terminals each of which is constituted by some specific piece of exchange equipment the switching network also having distribution modules for distributing clock signals and synchronising signals and control units for controlling and managing the terminal units and the distribution modules, the improvement wherein each group of terminal units comprises two clock and synchronisation circuits each having a time base connected to a distribution module, first and second synchronisation circuits each connected to a plane of the switching network via an outlet link and via a terminal inlet link to the terminal units, and third and fourth synchronisation circuits each connected via an inlet link to each of the planes to which the first and second synchronising circuits are connected and via a terminal outlet link to the terminal units, and wherein the control of a terminal unit by a control unit is performed by interchanging messages between the microprocessors of the terminal unit and the control unit, said interchange taking place over the switching network using a question and answer procedure on one of the time slots on said inlet and outlet links and said terminal inlet and outlet links.

2. A group of terminal units according to claim 1, wherein messages from a control unit to a terminal unit are received by all the terminal units of the group, each terminal unit including an address recognition circuit for recognising the destination of a message and for acting on it.

3. A group of terminal units according to claim 1, wherein messages from a control unit to a terminal unit are simultaneously sent on one time slot of each of the inlet links to the group, each terminal unit including means for selecting the inlet link from which messages are effectively received, and means for selecting the distribution module which is effectively used by the said terminal unit.

4. A group of terminal units according to claim 1, comprising subscriber equipment terminal units, wherein each terminal unit comprises:
a space matrix connected to outlet terminal links;
a space matrix connected to inlet terminal links;
Subscriber equipments connected to said matrices by a filter and a coder/decoder;
a control circuit for synchronising the coder/decoders with the time slots of the inlet and outlet terminal links;
a supervisory counter connected to the microprocessor for managing time limits that limit the duration of the messages and the duration of waiting for messages; and
an interchange circuit enabling the microprocessor to control the terminals.

5. A group of terminal units according to claim 1 comprising an auxiliary terminal for sending and receiving multifrequency signalling wherein the auxiliary terminal comprises:
a time matrix and a circuit for controlling the time matrix connected to the microprocessor;
a frequency generator connected to the matrix;
a coupler for providing a link between the microprocessor and the receiver and the generator; and a supervisory counter.

6. A group of terminal units according to claim 5, wherein the coupler comprises:
- a set of shift registers connected to the data bus of the microprocessor and to a multiplexer and to a demultiplexer providing access to serial send links and serial receive links connected to the generator and to the receiver; and
- an interrupt memory circuit enabling interrupt requests to be transmitted to the microprocessor from the receiver to transmit recognised multifrequency signalling thereto.

7. A group of terminal units according to claim 3, wherein each terminal unit manages the selection of the inlet link on which it takes account of messages from the control unit and the selection of the distribution module by means of two time outs:
- a first time out which overflows in the event of complete absence of messages on the selected inlet link, and which causes switching to another inlet link; and
- a second time out longer than the first time out, indicating the absence of messages from the command unit to the terminal unit, the second time out overflowing causes switchover to another link if an error is detected in a message.

* * * * *